United States Patent
Kouka et al.

(10) Patent No.: US 10,703,944 B2
(45) Date of Patent: Jul. 7, 2020

(54) ADHESIVE FOR LAMINATE OF METAL FOIL AND RESIN FILM, LAMINATED BODY, BATTERY EXTERIOR PACKAGING MATERIAL, AND BATTERY CASE AND MANUFACTURING METHOD THEREFOR

(71) Applicant: SHOWA DENKO K.K., Tokyo (JP)

(72) Inventors: Hiroto Kouka, Himeji (JP); Kazunari Fukase, Kawasaki (JP); Yasuhiro Nakagawa, Kakogawa (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/070,432

(22) PCT Filed: Dec. 9, 2016

(86) PCT No.: PCT/JP2016/086719
§ 371 (c)(1),
(2) Date: Jul. 16, 2018

(87) PCT Pub. No.: WO2017/134931
PCT Pub. Date: Aug. 10, 2017

(65) Prior Publication Data
US 2019/0023954 A1 Jan. 24, 2019

(30) Foreign Application Priority Data
Feb. 3, 2016 (JP) ................. 2016-018933

(51) Int. Cl.
| | | |
|---|---|---|
| *H01M 2/04* | (2006.01) | |
| *C09J 175/04* | (2006.01) | |
| *B32B 7/12* | (2006.01) | |
| *B32B 15/08* | (2006.01) | |
| *H01M 2/02* | (2006.01) | |
| *C08F 255/02* | (2006.01) | |
| *C09J 151/06* | (2006.01) | |
| *C08G 18/79* | (2006.01) | |
| *B32B 27/40* | (2006.01) | |
| *B32B 15/20* | (2006.01) | |
| *C08G 18/22* | (2006.01) | |
| *C08G 18/62* | (2006.01) | |
| *C08G 18/73* | (2006.01) | |
| *B29C 51/08* | (2006.01) | |
| *B29K 105/00* | (2006.01) | |
| *B29K 305/00* | (2006.01) | |
| *B29C 48/155* | (2019.01) | |
| *B29C 48/07* | (2019.01) | |
| *B29C 55/02* | (2006.01) | |
| *B29L 31/00* | (2006.01) | |

(52) U.S. Cl.
CPC .............. *C09J 175/04* (2013.01); *B32B 7/12* (2013.01); *B32B 15/08* (2013.01); *B32B 15/20* (2013.01); *B32B 27/40* (2013.01); *C08F 255/02* (2013.01); *C08G 18/222* (2013.01); *C08G 18/6204* (2013.01); *C08G 18/73* (2013.01); *C08G 18/791* (2013.01); *C09J 151/06* (2013.01); *H01M 2/0275* (2013.01); *H01M 2/0277* (2013.01); *H01M 2/0285* (2013.01); *H01M 2/0287* (2013.01); *B29C 48/07* (2019.02); *B29C 48/155* (2019.02); *B29C 51/08* (2013.01); *B29C 55/02* (2013.01); *B29K 2105/0097* (2013.01); *B29K 2305/00* (2013.01); *B29L 2031/7146* (2013.01); *B32B 2457/10* (2013.01)

(58) Field of Classification Search
CPC ........ H01M 2/0287; B32B 7/12; B32B 15/08; B32B 15/20; B32B 457/10; C09J 175/04; C08G 18/222; C08G 18/6204; C08G 18/73; B29C 55/02; B29L 2031/7146
See application file for complete search history.

(56) References Cited

U.S. PATENT DOCUMENTS

| | | |
|---|---|---|
| 2002/0123596 A1 | 9/2002 | Gurtler et al. |
| 2011/0104488 A1* | 5/2011 | Mussig ................. C09J 123/02 428/355 EN |
| 2013/0338284 A1 | 12/2013 | Ito et al. |

(Continued)

FOREIGN PATENT DOCUMENTS

| | | |
|---|---|---|
| CN | 103189462 A | 7/2013 |
| JP | 56-155220 A | 12/1981 |
| JP | 7-84437 A | 3/1995 |

(Continued)

OTHER PUBLICATIONS

International Search Report for PCT/JP2016/086719 dated Jan. 24, 2017 [PCT/ISA/210].

*Primary Examiner* — Jane J Rhee
(74) *Attorney, Agent, or Firm* — Sughrue Mion, PLLC

(57) ABSTRACT

An adhesive for laminating a metal foil to a resin film, the adhesive including: a polyol (A); a multimer of a polyisocyanate (B); and a metal compound (C) being a compound of at least one metal of Groups 7 and 12, wherein the multimer of a polyisocyanate (B) contains a multimer of a saturated aliphatic polyisocyanate and a multimer of a saturated alicyclic polyisocyanate. Also disclosed is a laminate having a metal foil and a resin film laminated through an adhesive layer obtained from the adhesive for laminating of the invention. Yet further disclosed is a packaging material for a battery casing obtained by using the laminate. Yet further disclosed is a battery case obtained by using the packaging material for a battery casing. Also disclosed is a method for producing a battery case which includes deep drawing or bulging the packaging material for a battery casing.

16 Claims, No Drawings

(56) References Cited

U.S. PATENT DOCUMENTS

2015/0004476 A1    1/2015   Ito et al.
2015/0367601 A1   12/2015   Ando et al.

FOREIGN PATENT DOCUMENTS

| JP | 2003-002873 A | 1/2003 |
|----|---------------|--------|
| JP | 2010-092703 A | 4/2010 |
| JP | 2014-89985 A | 5/2014 |
| WO | 2009/087776 A1 | 7/2009 |
| WO | 2013/114934 A1 | 8/2013 |
| WO | 2014/123183 A1 | 8/2014 |
| WO | 2016/199551 A1 | 12/2016 |

\* cited by examiner

ADHESIVE FOR LAMINATE OF METAL FOIL AND RESIN FILM, LAMINATED BODY, BATTERY EXTERIOR PACKAGING MATERIAL, AND BATTERY CASE AND MANUFACTURING METHOD THEREFOR

CROSS REFERENCE TO RELATED APPLICATIONS

This application is a National Stage of International Application No. PCT/JP2016/086719 filed Dec. 9, 2016, claiming priority based on Japanese Patent Application No. 2016-018933 filed Feb. 3, 2016.

TECHNICAL FIELD

The present invention relates to an adhesive for laminating a metal foil to a resin film suitable as an adhesive for a covering material of a secondary battery such as a lithium ion battery, a laminate produced by using the adhesive for laminating a metal foil to a resin film, a packaging material for a battery casing using the laminate, and a battery case formed of the packaging material for a battery casing and a method for producing the battery case.

BACKGROUND ART

In recent years, the reduction in size, weight, and thickness of electronic appliances such as notebook personal computers and mobile phones has proceeded. Therefore, higher energy density and reduction in weight are required also for secondary batteries for electronic appliances, and development of lithium ion batteries having high energy density has been actively made instead of conventional lead storage batteries and nickel hydride batteries. Further, a lithium ion battery which can be used also as a power source of an electric vehicle or a hybrid car has been put in practical use.

In the lithium ion battery, a compound containing lithium is used as a positive electrode material, and a carbon material such as graphite and coke is used as a negative electrode material. Further, between a positive electrode and a negative electrode, there is provided an electrolytic solution in which a lithium salt such as $LiPF_6$ and $LiBF_4$ as an electrolyte is dissolved in an aprotic solvent having osmotic force such as ethylene carbonate, propylene carbonate and diethyl carbonate or an electrolyte layer comprising a polymer gel impregnated with the electrolytic solution.

Conventionally, as a packaging material for a battery case, there has been known a laminate in which a stretched heat resistant resin film layer as an outer layer, an aluminum foil layer, and a non-stretched thermoplastic resin film layer as an inner layer are laminated in this order. In the case of a battery case obtained by using a packaging material for battery cases having such a structure, if a solvent having osmotic force like an electrolytic solution passes through a film layer serving as a sealant in a laminate used for the outer packaging of the battery, the laminate strength between an aluminum foil layer and a resin film layer may be reduced to cause the leakage of the electrolytic solution. Therefore, there has been developed a packaging material for battery cases in which an aluminum foil layer and an inner layer are bonded through an adhesive layer containing a resin containing a functional group having reactivity with isocyanates such as an acid anhydride group, a carboxyl group, and a hydroxy group, and a polyfunctional isocyanate compound.

For example, Patent Literatures 1 to 3 describe a method involving forming an adhesive layer using a solvent type adhesive in which a modified polyolefin resin obtained by graft-polymerizing an ethylenically unsaturated carboxylic acid or an anhydride thereof onto a propylene homopolymer or a copolymer of propylene and ethylene, and a polyfunctional isocyanate compound, are dissolved or dispersed in an organic solvent.

However, the modified polyolefin resin in Patent Literatures 1 to 3 was strongly influenced by factors determining the water content contained in the adhesive layer such as humidity at the time of coating and aging and the thickness of a substrate for a laminate. As a result, there was a problem that the adhesive layer formed showed variation in adhesive strength and was poor in electrolytic solution resistance.

CITATION LIST

Patent Literature

PTL1: JP 2010-92703 A
PTL2: JP 2014-89985 A
PTL3: WO 2013/114934

SUMMARY OF INVENTION

Technical Problem

The present invention has been completed taking the background art as described above into consideration, and an object of the present invention is to provide an adhesive for laminating a metal foil for laminating to a resin film, the adhesive having an excellent adhesive strength that is exhibited early and stably, and being excellent in electrolytic solution resistance. Further, another object of the present invention is to provide a laminate of a metal foil and a resin film, the laminate being excellent in electrolytic solution resistance and being suitable as a packaging material for a battery casing. Furthermore, a still another object of the present invention is to provide a battery case being excellent in electrolytic solution resistance, the battery case being formed of the packaging material for a battery casing comprising the laminate, and a method for producing the battery case.

Solution to Problem

Specifically, the present invention relates to the following [1] to [15].

[1] An adhesive for laminating a metal foil to a resin film, the adhesive comprising: a carboxyl group-containing polyolefin resin (A); a polyfunctional isocyanate compound (B); and a metal compound (C) being a compound of at least one metal of Groups 7 and 12.

[2] The adhesive for laminating a metal foil to a resin film according to [1], wherein the carboxyl group-containing polyolefin resin (A) comprises a modified polyolefin resin comprising, as a monomer unit, propylene or propylene and ethylene and an ethylenically unsaturated carboxylic acid or an anhydride thereof.

[3] The adhesive for laminating a metal foil to a resin film according to [1] or [2], wherein the carboxyl group-containing polyolefin resin (A) comprises a carboxyl group-containing polyolefin resin having an MFR of 5 g/10 min to 42 g/10 min as measured at 130° C.

[4] The adhesive for laminating a metal foil to a resin film according to any one of [1] to [3], wherein the polyfunctional isocyanate compound (B) comprises a multimer of a polyisocyanate.

[5] The adhesive for laminating a metal foil to a resin film according to any one of [1] to [4], wherein the multimer of a polyisocyanate comprises an isocyanurate of a polyisocyanate.

[6] The adhesive for laminating a metal foil to a resin film according to any one of [1] to [5], wherein the ratio of the number of isocyanato groups contained in the polyfunctional isocyanate compound (B) to the number of carboxyl groups contained in the carboxyl group-containing polyolefin resin (A) is 0.5 to 13.

[7] The adhesive for laminating a metal foil to a resin film according to any one of [1] to [6], wherein the metal compound (C) comprises at least one or more carboxylate of at least one metal of Groups 7 and 12.

[8] The adhesive for laminating a metal foil to a resin film according to any one of [1] to [7], wherein the metal compound (C) comprises a carboxylate of zinc or manganese.

[9] The adhesive for laminating a metal foil to a resin film according to any one of [1] to [8], further comprising a solvent (D).

[10] A laminate in which a metal foil and a resin film are laminated through an adhesive layer obtained from the adhesive for laminating a metal foil to a resin film according to any one of [1] to [9].

[11] The laminate according to [10], wherein the metal foil is aluminum foil, and the resin film comprises a heat-fusible resin film.

[12] The laminate according to [10] or [11], wherein the thickness of the metal foil is 10 to 100 μm, and the thickness of the resin film is 9 to 100 μm.

[13] A packaging material for a battery casing obtained by using the laminate according to any one of [10] to [12].

[14] A battery case obtained by using the packaging material for a battery casing according to [13].

[15] A method for producing a battery case, comprising: deep drawing or bulging the packaging material for a battery casing according to [13].

Advantageous Effects of Invention

The adhesive for laminating a metal foil to a resin film of the present invention is excellent in adhesive strength, and a laminate of a metal foil and a resin film which is formed by using the adhesive for laminating a metal foil to a resin film is excellent in electrolytic solution resistance. Therefore, the adhesive for laminating a metal foil to a resin film and the laminate are suitable as a material for a packaging material for a battery casing used for preparing a secondary battery such as a lithium ion battery. Further, a battery case formed by using the packaging material for a battery casing of the present invention is excellent in electrolytic solution resistance, and its use can provide a safe secondary battery having a long life.

DESCRIPTION OF EMBODIMENTS

[Adhesive for Laminating Metal Foil to Resin Film]

The adhesive for laminating a metal foil to a resin film according to an embodiment of the present invention comprises: a carboxyl group-containing polyolefin resin (A); a polyfunctional isocyanate compound (B); and a metal compound (C) being a compound of at least one metal of Groups 7 and 12.

In the adhesive for laminating a metal foil to a resin film according to the embodiment of the present invention, the carboxyl group-containing polyolefin resin (A) corresponds to a main agent, and the polyfunctional isocyanate compound (B) corresponds to a curing agent, and the metal compound (C) corresponds to a reaction accelerator.

The adhesive for laminating a metal foil to a resin film according to the embodiment of the present invention can be suitably used for the adhesion of a metal foil to a resin film. Particularly, it is useful as an adhesive for laminating a metal foil to a resin film, and a laminate therewith can be suitably used as a packaging material for a battery casing.

The symbol "-" used herein means a value before the "-" or more and a value after the "-" or less.

<Carboxyl Group-containing Polyolefin Resin (A)>

The carboxyl group-containing polyolefin resin (A) used in the embodiment of the present invention (hereinafter also referred to "component (A)" or "(A)") is not particularly limited, as long as it contains a carboxyl group in its molecular structure. The "carboxyl group" as used herein includes not only a constituent unit derived from a carboxylic acid but also a constituent unit derived from a carboxylic acid anhydride. Examples of such resin includes a resin obtained by graft polymerizing a carboxyl group-containing monomer to a polyolefin, a resin obtained by copolymerization of a carboxyl group-containing monomer with an olefin, and a resin obtained by copolymerizing in the combination of the graft polymerization and the copolymerization.

Examples of the carboxyl group-containing monomer include an ethylenically unsaturated carboxylic acid such as acrylic acid or methacrylic acid; an ethylenically unsaturated carboxylic acid anhydride such as maleic anhydride, citraconic anhydride or itaconic anhydride; and a carboxyl-group containing ethylenically unsaturated carboxylic acid ester such as β-carboxyethyl (meth)acrylate. Among them, maleic anhydride is more preferred.

The carboxyl group-containing polyolefin resin (A) may also comprise, as a monomer unit, an ethylenically unsaturated carboxylic acid ester having no carboxyl group. Examples of the ethylenically unsaturated carboxylic acid ester having no carboxyl group include an esterified product of acrylic acid or methacrylic acid and a carboxyl group-free alcohol having 1 to 20 carbon atoms, such as methyl (meth)acrylate, ethyl (meth)acrylate, propyl (meth)acrylate, butyl (meth)acrylate, hexyl (meth)acrylate, octyl (meth)acrylate, decyl (meth)acrylate, dodecyl (meth)acrylate, lauryl (meth)acrylate or stearyl (meth)acrylate. A mixture thereof may be used. The phrase "the carboxyl-group containing polyolefin resin (A) comprises as a monomer unit" used herein refers to "the carboxyl-group containing polyolefin resin (A) comprises as a raw material monomer in polymerizing the carboxyl-group containing polyolefin resin (A)".

Examples of the polyolefin resin include a resin comprising, as a monomer unit, a monoolefin such as ethylene, propylene, butene, pentene, hexene, heptene, octene or 4-methyl-1-pentene; an alicyclic olefin such as cyclopentene or cyclohexene; a chain or cyclic polyene such as 1,4-hexadiene, 1,5-hexadiene, divinylbenzene, 1,3-cyclopentadiene, 1,3-cyclohexadiene or 5-vinyl-2-norbornene; and an aromatic vinyl compound such as styrene or a substituted styrene. Among them, from the viewpoint of adhesion to a polyolefin substrate, a resin comprising, as a monomer unit, propylene or ethylene and propylene is preferable.

The carboxyl-group-containing-polyolefin resin (A) preferably comprises a carboxyl group-containing polyolefin resin having an MFR (melt mass-flow rate) of 5 g/10 min to 42 g/10 min as measured at 130° C. When the MFR is 5 g/10 min or more, the adhesive strength of the adhesive layer obtained from the adhesive for laminating of a metal foil to a resin film according to the embodiment of the present invention will be hardly reduced even if it comes into contact with an electrolytic solution; and when the MFR is 42 g/10 min or less, the operability of the adhesive for laminating a metal foil to a resin film according to the embodiment of the present invention on coating will be satisfactory. Note that the MFR used herein is a value obtained under the conditions of a temperature of 130° C. and a load of 2,160 g according to the method described in JIS K 7210. The MFR of the carboxyl group-containing polyolefin resin (A) as measured at 130° C. is more preferably 8 g/10 min to 40 g/10 min, and still more preferably from 12 g/10 min to 40 g/10 min.

The acid value of the carboxyl group-containing polyolefin resin (A) is preferably 3 to 60 mg KOH/g, more preferably 5 to 50 mg KOH/g, and still more preferably 5 to 45 mg KOH/g. When the acid value is 3 mg KOH/g or more, the adhesive strength of the adhesive layer obtained from the adhesive for laminating of a metal foil to a resin film according to the embodiment of the present invention will be hardly reduced even if it comes into contact with an electrolytic solution; and when the acid value is 60 mg KOH/g or less, the operability of the adhesive for laminating a metal foil to a resin film according to the embodiment of the present invention on coating will be satisfactory. Note that the acid value used herein is a value obtained according to the method described in JIS 0070.

<Polyfunctional Isocyanate Compound (B)>

The polyfunctional isocyanate compound (B) used in the embodiment of the present invention (hereinafter also referred to "component (B)" or "(B)") is not particularly limited, as long as it is a polyisocyanate containing two or more isocyanato groups or a multimer thereof. The polyfunctional isocyanate compound (B) in the embodiment of the present invention is used as a curing agent in the adhesive for laminating a metal foil to a resin film according to the embodiment of the present invention.

Examples of the polyfunctional isocyanate compound (B) include saturated alicyclic diisocyanates such as 1,4-cyclohexane diisocyanate, isophorone diisocyanate, methylenebis (4-cyclohexyl isocyanate), 1,3-bis(isocyanatomethyl)cyclohexane, 1,4-bis(isocyanatomethyl)cyclohexane, and norbornane diisocyanate; aromatic diisocyanates such as 2,4-tolylene diisocyanate, 2,6-tolylene diisocyanate, diphenylmethane-4,4'-diisocyanate, 1,3-xylylene diisocyanate, and 1,4-xylylene diisocyanate; and aliphatic diisocyanates such as hexamethylene diisocyanate, 2,4,4-trimethylhexamethylene diisocyanate, and 2,2,4-trimethylhexamethylene diisocyanate; and allophanatized multimers; isocyanurate; and biuret-modified products thereof. These may be used singly or in combination of two or more. The polyfunctional isocyanate compound (B) is more preferably a multimer of a polyisocyanate, such as an allophanatized multimer, an isocyanurate and a biuret-modified product thereof. The use of the polyisocyanate in the form of a multimer will make the adhesive for laminating a metal foil to a resin film to be excellent in electrolytic solution resistance. For unknown reasons, it is presumed that it is because the structures of the isocyanurate and the allophanatized multimer and the like are excellent in electrolytic solution resistance. Among these multimers of a polyisocyanate, an isocyanurate of a polyisocyanate is excellent in electrolytic solution resistance and particularly preferred.

The ratio of the number of isocyanato groups contained in the polyfunctional isocyanate compound (B) to the number of carboxyl groups contained in the carboxyl group-containing polyolefin resin (A) (hereinafter also referred to as "NCO/COOH ratio") is preferably 0.3 to 15, more preferably 0.5 to 10, and still more preferably 0.8 to 10. When the NCO/COOH ratio is 0.3 or more, the adhesive strength of the adhesive layer obtained from the adhesive for laminating a metal foil to a resin film according to the embodiment of the present invention, particularly the adhesive strength of the adhesive layer to the resin film, will be satisfactory; and when the NCO/COOH ratio is 15 or less, the adhesive strength of the adhesive layer obtained from the adhesive for laminating a metal foil to a resin film according to the embodiment of the present invention will be hardly reduced even if the adhesive layer contacts an electrolytic solution. When the carboxyl group is a constituent unit derived from a carboxylic acid anhydride, note that the NCO/COOH ratio is calculated considering that 1 mol of the carboxyl group is equivalent to 2 mol of the carboxyl group as a constituent unit derived from a carboxylic acid.

<Metal Compound (C) being a Compound of at least One Metal of Groups 7 and 12>

The metal compound (C) being a compound of at least one metal of Groups 7 and 12 of the Periodic Table in the embodiment of the present invention (hereinafter also referred to as "metal compound(s) of Groups 7 and/or 12 (C)" or "metal compound (C)" or "component (C)" or "(C)") is used as a reaction accelerator to accelerate the reaction of the carboxyl group-containing polyolefin resin (A) and the polyfunctional isocyanate compound (B) in the adhesive for laminating a metal foil to a resin film according to the embodiment of the present invention.

The metal compound (C) being a compound of at least one metal of Groups 7 and 12 used in the embodiment of the present invention includes a compound of a metal element of Group 7 selected from the group consisting of manganese, technetium and rhenium and a compound of a metal element of Group 12 selected from the group consisting of zinc, cadmium and mercury, and these compounds can be used alone or in combination thereof.

Examples of the metal compound (C) being a compound of at least one metal of Groups 7 and 12 include a metal carboxylate such as a metal hexanoate, a metal octylate (2-ethylhexanoate), a metal neodecanoate, a metal stearate and a metal oleate, and a metal acetylacetonate. Among of them, from the point of view of the adhesive strength after immersing in an electrolytic solution for a long period, the metal compound (C) preferably comprises one or more carboxylates of at least one metal of Groups 7 and 12, more preferably one or more carboxylates of a metal selected from the group consisting of zinc and manganese, and still more preferably a carboxylate of zinc.

Specifically, the metal compound (C) being a compound of at least one metal of Groups 7 and 12 is preferably zinc neodecanoate ($C_{20}H_{38}O_4Zn$), zinc 2-ethylhexanoate (zinc octylate, zinc hexoate, $C_{16}H_{30}O_4Zn$), zinc stearate ($C_{36}H_{70}O_4Zn$), zinc acetylacetonate ($C_{10}H_{14}O_4Zn$) and manganese 2-ethylhexanoate (manganese octylate, manganese hexoate, $C_{16}H_{30}O_4Mn$), and more preferably zinc neodecanoate ($C_{20}H_{38}O_4Zn$) and zinc 2-ethylhexanoate (zinc octylate, zinc hexoate, $C_{16}H_{30}O_4Zn$).

As a reaction accelerator other than the component (C), an organotin compound such as dibutyltin dilaurate, dioctyltin dilaurate and dioctyltin diacetate, or a tertiary amine such as 2,4,6-tris(dimethylaminomethyl)phenol, dimethyl aniline, dimethyl p-toluidine and N, N-di(β-hydroxyethyl)-p-toluidine may be used in combination with the component (C).

The ratio of the metal compound (C) being a compound of at least one metal of Groups 7 and 12 based on 100 parts by mass of the carboxyl group-containing polyolefin resin (A) is not particularly limited, but the content of the metal compound (C) based on 100 parts by mass of the carboxyl group-containing polyolefin resin (A) is preferably 0.0001 to 5 parts by mass, more preferably 0.0005 to 5 parts by mass, and still more preferably 0.001 to 5 parts by mass, in terms of the mass of the metal. When the content of the metal compound (C) is 0.0001 parts by mass or more, the adhesive strength of the adhesive layer obtained from the adhesive for laminating a metal foil to a resin film of the present invention will sufficiently increase even after immersing in an electrolytic solution for a long period, and when the content of the metal compound (C) is 5 parts by mass or less, the adhesive strength in a normal state will increase. Note that the metal compound(s) of Groups 7 and 12 (C) may be added at the time of producing the carboxyl group-containing polyolefin resin (A) or may be added at the time of preparing the adhesive.

<Solvent (D)>

The adhesive for laminating a metal foil to a resin film according to the embodiment of the present invention may also comprise a solvent (D) (hereinafter may be referred to as "component (D)" or "(D)").

The solvent (D) is not particularly limited as long as it can dissolve or disperse the carboxyl group-containing polyolefin resin (A), the polyfunctional isocyanate compound (B) and the metal compound (C) being a compound of at least one metal of Groups 7 and 12. Examples of the solvent (C) include aromatic organic solvents such as toluene and xylene, alicyclic organic solvents such as cyclohexane, methylcyclohexane, and ethylcyclohexane, aliphatic organic solvents such as n-hexane and n-heptane, ester-based organic solvents such as ethyl acetate, propyl acetate, and butyl acetate, and ketone-based organic solvents such as acetone, methyl ethyl ketone, and methyl butyl ketone. These may be used singly or in combination of two or more.

Among these, especially in view of the solubility of the carboxyl group-containing polyolefin resin (A), ethyl acetate, propyl acetate, butyl acetate, toluene, methylcyclohexane, and methyl ethyl ketone are preferred, and ethyl acetate, toluene, and methylcyclohexane are more preferred.

The content of the solvent (D) in the adhesive for laminating a metal foil to a resin film according to the embodiment of the present invention is preferably 30 to 95% by mass, more preferably 40 to 90% by mass, and still more preferably 50 to 80% by mass. When the content of the solvent (D) is 30% by mass or more, the operability of the adhesive for laminating a metal foil to a resin film according to the embodiment of the present invention on coating will be satisfactory; and when the content of the solvent (D) is 95% by mass or less, the controllability of the thickness of the laminate obtained by coating and curing the adhesive for laminating a metal foil to a resin film according to the embodiment of the present invention will be satisfactory.

<Other Components>

The adhesive for laminating a metal foil to a resin film of the embodiment of the present invention may optionally comprise additives such as a tackifier, and a plasticizer.

The tackifier is not particularly limited. Examples thereof include natural tackifiers such as a polyterpene resin and a rosin resin, and petroleum-based tackifiers such as an aliphatic (C5) resin, an aromatic (C9) resin, a copolymer (C5/C9) resin, and an alicyclic resin obtained from cracked petroleum fractions of naphtha. Further examples include a hydrogenated resin in which a double bond part of these resins is hydrogenated. These tackifiers may be used singly or in combination of two or more. Examples of the plasticizer include, but not particularly limited to, liquid rubbers such as polyisoprene and polybutene, and process oil.

Further, thermoplastic resins and thermoplastic elastomers other than the carboxyl group-containing polyolefin resin (A), may be contained as long as they do not impair the effect of the embodiment of the present invention. Examples of the thermoplastic resins and the thermoplastic elastomers which can be contained include an ethylene-vinyl acetate copolymer resin, an ethylene-ethyl acrylate copolymer resin, SEBS (styrene-ethylene-butylene-styrene), and SEPS (styrene-ethylene-propylene-styrene).

The total content of components (A), (B), (C) and (D) in the adhesive for laminating a metal foil to a resin film according to the embodiment of the present invention is preferably 80% by mass or more, more preferably 90% by mass or more, still more preferably 95% by mass or more, and further still more preferably 98% by mass or more.

[Laminate]

The laminate according to the embodiment of the present invention is obtained by laminating a metal foil to a resin film through an adhesive layer obtained from the adhesive for laminating a metal foil to a resin film of the embodiment of the present invention (hereinafter may be simply referred to as the "laminating adhesive according to the embodiment of the present invention").

Further, as long as the laminate according to the embodiment of the present invention contains a layer in which a metal foil is joined to a resin film through an adhesive layer obtained from the laminating adhesive according to the embodiment of the present invention, the laminate may contain other layers in which metal foils and/or resin films are joined to each other through the adhesive layer obtained from the laminating adhesive of the present invention. Known methods, such as a heat lamination method and a dry lamination method, can be used as the joining method. In the embodiment of the present invention, the heat lamination method comprises heat melting a laminating adhesive according to the embodiment of the present invention comprising no solvent (D) on the surface of a layer to be in contact with an adhesive layer or heat extruding the laminating adhesive together with the layer to be in contact with the adhesive layer, thereby inserting the laminating adhesive between the layers of a laminate to form the adhesive layer. Further, in the embodiment of the present invention, the dry lamination method comprises coating and drying a laminating adhesive according to the embodiment of the present invention comprising a solvent (D) on the surface of a layer to be in contact with an adhesive layer, stacking other layers thereon, and sticking them by compression, thereby inserting the laminating adhesive between the layers of a laminate to form the adhesive layer.

As a metal foil, a metal foil made from pure aluminum or an O material (soft material) of an aluminum-iron alloy or the like is generally used and preferred. The thickness of aluminum foil is preferably about 10 to 100 μm for securing processability and for securing barrier properties of preventing permeation of oxygen and moisture through a laminate. When the thickness of aluminum foil is less than 10 μm, the aluminum foil may break during forming or a pinhole may occur, causing permeation of oxygen and moisture through a laminate. On the other hand, when the thickness of aluminum foil exceeds 100 µm, the improvement effect of breakage during forming and the effect of preventing occurrence of pinhole will not be particularly improved, but only the total thickness of a laminate will be high, thus increasing its mass. Aluminum foil having a thickness of about 30 to 50 µm is generally used, and it is preferred to use aluminum foil having a thickness of 40 to 50 µm. Note that aluminum foil is preferably subjected to undercoat treatment with a silane coupling agent, a titanium coupling agent, or the like, and/or chemical conversion treatment such as chromate treatment, for improving adhesive properties with a resin film and improving corrosion resistance.

As a resin film, a heat-fusible resin film made of polypropylene, polyethylene, maleic acid-modified polypropylene, an ethylene-acrylate copolymer, an ionomer resin, or the like is preferred. These resins have heat-sealing properties and function for improving the chemical resistance. The thickness of these films is preferably 9 to 100 µm, more preferably 20 to 80 µm, and still more preferably 40 to 80 µm. When the thickness of a resin film is 9 µm or more, sufficient heat sealing strength will be obtained, and the corrosion resistance will be satisfactory. When the thickness of a resin film is 100 µm or less, it will have a sufficient strength and good formability.

The applications of the laminate according to the embodiment of the present invention are not particularly limited, and examples of useful applications include packaging applications. Examples of the contents to be packaged with the laminate include a liquid material containing an acid, an alkali, an organic solvent, or the like, including a solvent-based material such as a putty (such as a putty for thick coating and a putty for thin coating), a coating material (such as oil paint), lacquer (such as clear lacquer), and a compound for motor vehicles. Further, since the laminate is suitable also for packaging the electrolytic solution of a lithium ion battery, it can be used as a packaging material for a battery casing, which is preferred. When the laminate is used as a packaging material for a battery casing, the metal foil is preferably aluminum foil; the resin film preferably comprises a heat-fusible resin film; and an outer layer comprising a heat resistant resin film is preferably provided outside the aluminum foil.

[Packaging Material for Battery Casing]

The packaging material for a battery casing according to the embodiment of the present invention is formed by using the laminate according to the embodiment of the present invention.

The packaging material for a battery casing according to the embodiment of the present invention is preferably a packaging material in which an outer layer comprising a resin film, particularly a heat resistant resin film is provided outside the metal foil of the laminate according to the embodiment of the present invention. Further, in order to improve the characteristics such as mechanical strength and electrolytic solution resistance as needed, the packaging material may have a constitution in which a first intermediate resin layer or/and a second intermediate resin layer are added. In a preferred form, the packaging material may specifically have the following constitutions. Note that the adhesive layer means the "adhesive layer obtained from the laminating adhesive according to the embodiment of the present invention", and the metal foil layer is illustrated as the aluminum foil layer.

(1) Outer layer/aluminum foil layer/adhesive layer/resin film layer
(2) Outer layer/first intermediate resin layer/aluminum foil layer/adhesive layer/resin film layer
(3) Outer layer/aluminum foil layer/second intermediate resin layer/adhesive layer/resin film layer
(4) Outer layer/first intermediate resin layer/aluminum foil layer/second intermediate resin layer/adhesive layer/resin film layer
(5) Coating layer/outer layer/aluminum foil layer/adhesive layer/resin film layer
(6) Coating layer/outer layer/first intermediate resin layer/aluminum foil layer/adhesive layer/resin film layer
(7) Coating layer/outer layer/aluminum foil layer/second intermediate resin layer/adhesive layer/resin film layer
(8) Coating layer/outer layer/first intermediate resin layer/aluminum foil layer/second intermediate resin layer/adhesive layer/resin film layer (First Intermediate Resin Layer and Second Intermediate Resin Layer)

In the above constitutions, a polyamide resin, a polyester resin, a polyethylene resin, or the like is used as the first intermediate resin layer, for the purpose of improving the mechanical strength of a packaging material for a battery casing. A heat adhesive extruded resin, such as a polyamide resin, a polyester resin, a polyethylene resin, and polypropylene, is used as the second intermediate resin layer similar to the first intermediate resin layer, mainly for the purpose of improving electrolytic solution resistance. A single-layer resin film and a multi-layer resin film (produced by two-layer co-extrusion, three-layer co-extrusion, or the like) can be used as the resin film layer. Further, the single-layer resin film and the multi-layer co-extruded resin film can also be used as the second intermediate resin layer. The thickness of the first intermediate resin layer and the second intermediate resin layer is, but not particularly limited to, normally about 0.1 to 30 µm when these layers are provided.

(Outer Layer)

The resin film used for the outer layer needs to be excellent in heat resistance, formability, insulation properties, and the like, and a stretched film of a polyamide (nylon) resin or a polyester resin is generally used. The thickness of the outer layer film is about 9 to 50 µm. When the thickness is less than 9 µm, the elongation of the stretched film will be poor when a packaging material is formed, which may lead to the occurrence of necking in the aluminum foil to easily result in poor forming. On the other hand, when the thickness is more than 50 µm, the effect of formability is not necessarily improved, and conversely, the volume energy density is reduced, leading only to cost increase. The thickness of the outer layer film is more preferably about 10 to 40 µm, further preferably 20 to 30 µm.

It is preferred to use the following film as a resin film used for the outer layer, in terms of obtaining a sharper shape: the film has a tensile strength of 150 N/mm$^2$ or more, preferably 200 N/mm$^2$ or more, and further preferably 250 N/mm$^2$ or more and a tensile elongation in three directions of 80% or more, preferably 100% or more, and further preferably 120% or more, when the film is cut to a predetermined size so that each of the three directions of 0°, 45°, and 90° may be the direction of tensileness and then subjected to a tensile test, where the direction of stretch of the stretched film is 0°. The above effect is sufficiently exhibited when the film has a tensile strength of 150 N/mm$^2$ or more or has a tensile elongation of 80% or more. Note that the values of the tensile strength and the tensile elongation are values at break in the tensile test of the film (a test piece: 150 mm in length×15 mm in width×9 to 50 µm in thickness, a stress rate: 100 mm/min). The test pieces are cut in each of the three directions.

(Metal Foil)

A metal foil plays a role of a barrier to water vapor and the like, and pure aluminum or an O material (soft material) of an aluminum-iron alloy is generally used and preferred as the material of the metal foil. The thickness of aluminum foil is preferably about 10 to 100 µm for securing processability and for securing barrier properties of preventing permeation of oxygen and moisture into packaging. If the thickness of aluminum foil is less than 10 µm, the aluminum foil may break during forming or a pinhole may occur, causing permeation of oxygen and moisture. On the other hand, if the thickness of aluminum foil exceeds 100 µm, the improvement effect of breakage during forming and the effect of preventing occurrence of pinhole will not be particularly improved, but only the total thickness of a packaging material will be high, thus increasing mass and reducing volume energy density. Aluminum foil having a thickness of about 30 to 50 µm is generally used, and it is preferred to use aluminum foil having a thickness of 40 to 50 µm. Note that aluminum foil is preferably subjected to undercoat treatment with a silane coupling agent, a titanium coupling agent, and the like or chemical conversion treatment such as chromate treatment and the like, for improving adhesive properties with a resin film and improving corrosion resistance.

(Resin Film)

As a resin film, a heat-fusible resin film made of polypropylene, polyethylene, maleic acid-modified polypropylene, an ethylene-acrylate copolymer, an ionomer resin, or the like is preferred. These resins have heat-sealing properties and function for improving the chemical resistance to a highly corrosive electrolytic solution of a lithium secondary battery and the like. The thickness of these films is preferably 9 to 100 µm, more preferably 20 to 80 µm, and still more preferably 40 to 80 µm. When the thickness of a resin film is 9 µm or more, sufficient heat sealing strength will be obtained, and the corrosion resistance to an electrolytic solution and the like will be satisfactory. When the thickness of a resin film is 100 µm or less, a packaging material for a battery casing will have a sufficient strength and good formability.

(Coating Layer)

The packaging material for a battery casing according to the embodiment of the present invention may be provided with a coating layer on an outer layer. Examples of the method of forming a coating layer include a method involving coating the outer layer with a polymer having gas barrier properties and a method involving vapor-depositing aluminum metal or an inorganic oxide such as silicon oxide and aluminum oxide to coat the outer layer with a thin film of the metal or the inorganic substance. A laminate having better barrier properties against water vapor and other gases can be obtained by providing a coating layer.

[Battery Case]

The battery case according to the embodiment of the present invention is formed by using the packaging material for a battery casing according to the embodiment of the present invention. For example, it is formed of the packaging material for a battery casing. The packaging material for a battery casing according to the embodiment of the present invention is excellent in electrolytic solution resistance, heat resistance, and barrier properties against water vapor and other gases, and is suitably used as a battery case for a secondary battery, particularly for a lithium ion battery. Further, since the packaging material for a battery casing according to the embodiment of the present invention has very good formability, the battery case according to the embodiment of the present invention can be simply obtained by forming according to a known method. The method of forming is not particularly limited, but when the packaging material is formed by deep drawing or bulging, a battery case having a highly complicated shape and a high dimensional accuracy can be produced.

EXAMPLES

Hereinafter, the present invention will be more specifically described with reference to Examples and Comparative Examples, but the present invention is not limited to these Examples at all.

The carboxyl group-containing polyolefin resin (A) used for producing each of the adhesives for laminating a metal foil to a resin film of Examples 1 to 11 and Comparative Examples 1 to 3 was evaluated as follows.
<Measurement of Acid Value of Carboxyl Group-containing Polyolefin Resin (A)>

The acid value of the carboxyl group-containing polyolefin resin (A) was measured according to JIS 0070.
<Measurement of MFR of Carboxyl Group-containing Polyolefin Resin (A)>

The MFR of the carboxyl group-containing polyolefin resin (A) was measured under the conditions of a temperature of 130° C. and a load of 2,160 g according to the method described in JIS K 7210.

Each of the adhesives for laminating a metal foil to a resin film of Examples 1 to 11 and Comparative Examples 1 to 3 was evaluated as follows.
<Calculation of NCO/COOH Ratio of Adhesive>

The number of isocyanato groups contained in the polyfunctional isocyanate compound (B) used for producing the adhesives for laminating a metal foil to a resin film of Examples 1 to 11 and Comparative Examples 1 to 3 was measured according to JIS K 6806. The number of carboxyl groups contained in the carboxyl group-containing polyolefin resin (A) was also calculated from the acid value of the carboxyl group-containing polyolefin resin (A) measured above. Then, the ratio of the number of isocyanato groups to the number of carboxyl groups (NCO/COOH ratio) was calculated from the number of isocyanato groups and the number of carboxyl groups.
<Determination of Pot Life>

Each of the adhesives was stored at 30° C. for 12, 24 and 48 hours and then coated on a non-stretched polyolefin film, and the coating quality of each adhesive was determined according to the following criteria:

Excellent . . . after 48 hours, coatable;

Good . . . after 24 hours, coatable, but after 48 hours, uncoatable due to thickening or gelling;

Fair . . . after 12 hours, coatable, but after 24 hours, uncoatable due to thickening or gelling; and Poor . . . after 12 hours, uncoatable due to thickening or gelling.

The packaging material for a battery case produced by using each of the adhesives for laminating a metal foil to a resin film of Examples and Comparative Examples was evaluated for the following peel strength. A piece having 150 mm in length×15 mm in width which was cut from the resulting packaging material for a battery casing was used as a test piece.

<Peel Strength>
(1) T-Peel Strength at Normal State

The test piece was measured for the 90° peel strength between an aluminum foil layer and a non-stretched polypropylene film layer with Autograph AG-X (manufactured by Shimadzu Corporation) by peeling the layers at a peel rate of 100 mm/min in an atmosphere of 23° C.×50% RH.

(2) T-Peel Strength after Immersing in Electrolytic Solution Solvent

The test piece was immersed in an electrolytic solution solvent (propylene carbonate/diethyl carbonate, mass ratio: 50/50), allowed to stand in 85° C. atmosphere for one day, and then taken out of the solvent. It was measured for the 90° peel strength between an aluminum foil layer and a non-stretched polypropylene film layer in the same manner as (1).

The carboxyl group-containing polyolefin resin (A) used for producing each of the adhesives for laminating a metal foil to a resin film of Examples 1 to 11 and Comparative Examples 1 to 3 was produced as follows.

Synthesis Example 1

100 parts by mass of propylene-ethylene random copolymer (propylene-ethylene molar ratio: 97:3, MFR: 10 g/10 min) produced by using a metallocene catalyst as a polymerization catalyst, 2 parts by mass of maleic anhydride, 1 part by mass of lauryl methacrylate and 1.5 parts by mass of di-t-butyl peroxide were kneaded with a twin-screw extruder in which a maximum temperature of the cylinder part was set at 170° C. and allowed them to react. Thereafter, the mixture was degassed under reduced pressure in the extruder and residual unreacted substances were removed to obtain a carboxyl-group containing polyolefin resin (a1).

Synthesis Examples 2 to 7

Each of carboxyl group-containing polyolefin resins (a2) to (a7) was obtained in the same way as in Synthesis Example 1 except that a propylene-ethylene random copolymer having a different MFR, a propylene polymer or a propylene-ethylene-butene random copolymer was used as shown in Table 1.

Each of the adhesive for laminating a metal foil to a resin film of Examples 1 to 11 and Comparative Examples 1 to 3 was prepared as follows.

Example 1

15 g of a carboxyl group-containing polyolefin resin (a1) as a component (A) was dispersed in 85.0 g of a mixed solvent of toluene/ethyl acetate (mass ratio: 9/1) as a solvent (D). Then, 1.74 g of Duranate TKA-100 (an isocyanurate of hexamethylene diisocyanate, manufactured by Asahi Kasei Chemicals Corporation, isocyanate group content: 21.7%) as a component (B) and 0.50 g of "BiCAT Z" (zinc neodecanoate, manufactured by Shepherd Chemical Company) as a component (C) were added thereto to prepare an adhesive for laminating a metal foil to a resin film.

Examples 2 to 11 and Comparative Examples 1 to 3

Each of the adhesives for laminating a metal foil to a resin film of Examples 2 to 11 and Comparative Examples 1 to 3 was prepared in the same manner as in Example 1 except that each of the components shown in Tables 2 to 3 was used.

A packaging material for a battery case having a structure of outer layer/adhesive for outer layer/aluminum foil layer/adhesive for inner layer/inner layer was produced by a dry lamination method using each of the adhesives for laminating a metal foils to a resin film of Examples 1 to 11 and Comparative Examples 1 to 3.

Outer layer: PET/stretched polyamide laminated film (thickness: 27 μm)

Adhesive for outer layer: Urethane adhesive for dry lamination (AD502/CAT10, manufactured by Toyo-Morton, Ltd., coating amount: 3 g/m$^2$ (in coating))

Aluminum foil layer: Aluminum foil of aluminum-iron alloy (AA standard 8079-0 material, thickness: 40 μm)

Adhesive for inner layer: Adhesive for laminating a metal foil to a resin film (coating amount: thickness after drying being 2 μm)

Inner layer: Non-stretched polypropylene film (thickness: 80 μm)

Aging conditions and period after adhesion: 40° C., 5% RH, 24 hours

[Evaluation Results]

Table 1 shows the evaluation results of each of polyolefin resins used for producing the adhesives for laminating a metal foil to a resin film of Examples 1 to 11 and Comparative Examples 1 to 3. Table 2 shows the evaluation results of each of the adhesives for laminating a metal foil to a resin film of Examples 1 to 11, and Table 4 shows the evaluation results of each of the adhesives for laminating a metal foil to a resin film of Comparative Examples 1 to 3. In addition, Table 2 shows the evaluation results of each of packaging materials for a battery case prepared using the adhesives for laminating a metal foil to a resin film of Examples 1 to 11, and Table 3 shows the evaluation results of each of packaging materials for a battery case prepared using the adhesives for laminating a metal foil to a resin film of Comparative Examples 1 to 3.

The details of each component in Tables 2 are as follows.

Zinc hexoate: a mixture of zinc 2-ethylhexanoate (65 parts by mass) and mineral spirits (35 parts by mass), manufactured by TOEI CHEMICAL INDUSTRY CO., LTD.;

Afco Chem ZNS-P: zinc stearate, manufactured by ADEKA CORPORATION;

Zinc acetylacetonate: a reagent manufactured by Tokyo Chemical Industry Co., Ltd.;

Manganese hexoate: a mixture of manganese octylate (42 parts by mass) and mineral spirits (58 parts by mass), manufactured by TOEI CHEMICAL INDUSTRY CO., LTD.;

KS-1260: butyltin dilaurate, manufactured by Sakai Chemical Industry Co., Ltd.;

Titanium acetylacetonate: a reagent manufactured by Tokyo Chemical Industry Co., Ltd.; and BiCAT 8210: a mixture of bismuth tris(2-ethylhexanoate) (89 parts by mass) and 2-ethylhexanoic acid (11 parts by mass), manufactured by Shepherd Chemical Company.

TABLE 1

| Composition (Unit: g) | | Synthesis Example 1 Carboxyl group-containing polyolefin resin (a1) | Synthesis Example 2 Carboxyl group-containing polyolefin resin (a2) | Synthesis Example 3 Carboxyl group-containing polyolefin resin (a3) | Synthesis Example 4 Carboxyl group-containing polyolefin resin (a4) | Synthesis Example 5 Carboxyl group-containing polyolefin resin (a5) | Synthesis Example 6 Carboxyl group-containing polyolefin resin (a6) | Synthesis Example 7 Carboxyl group-containing polyolefin resin (a7) |
|---|---|---|---|---|---|---|---|---|
| Propylene-ethylene copolymer | Propylene-ethylene molar ratio | 97:3 | 97:3 | 97:3 | 97:3 | 97:3 | | |
| | MFR (g/10 min) | 10 | 5 | 36 | 1 | 42 | | |
| Propylene polymer | MFR (g/10 min) | | | | | | 8 | |
| Propylene-ethylene-butene copolymer | Propylene-ethylene-butene molar ratio | | | | | | | 95:3:2 |
| | MFR (g/10 min) | | | | | | | 10 |
| Acid value of carboxyl group-containing polyolefin resin (mg KOH/g) | | 22.4 | 22.4 | 22.4 | 22.4 | 22.4 | 22.4 | 22.4 |
| MFR of carboxyl group-containing polyolefin resin (g/10 min) | | 12 | 8 | 40 | 3 | 45 | 11 | 11 |

TABLE 2

| Composition (Unit: g) | | Example 1 | 2 | 3 | 4 | 5 | 6 | 7 | 8 | 9 | 10 | 11 |
|---|---|---|---|---|---|---|---|---|---|---|---|---|
| | | Composition 1 | 2 | 3 | 4 | 5 | 6 | 7 | 8 | 9 | 10 | 11 |
| Component (A) Carboxyl group-containing polyolefin resin | (a1) | 15.00 | | | | | | | 15.00 | 15.00 | 15.00 | 15.00 |
| | (a2) | | 15.00 | | | | | | | | | |
| | (a3) | | | 15.00 | | | | | | | | |
| | (a4) | | | | 15.00 | | | | | | | |
| | (a5) | | | | | 15.00 | | | | | | |
| | (a6) | | | | | | 15.00 | | | | | |
| | (a7) | | | | | | | 15.00 | | | | |
| Component (B) Polyfunctional isocyanate | Duranate TKA-100 (isocyanurate of hexamethylene diisocyanate) | 1.74 | 1.74 | 1.74 | 1.74 | 1.74 | 1.74 | 1.74 | 1.74 | 1.74 | 1.74 | 1.74 |
| Component (C) Metal catalyst | BiCAT Z (zinc neodecanoate) | 0.50 | 0.50 | 0.50 | 0.50 | 0.50 | 0.50 | 0.50 | | | | |
| | Zinc 2-ethylhexanoate (included in zinc hexoate) | | | | | | | | 0.50 | | | |
| | Afco Chem ZNS-P (zinc stearate) | | | | | | | | | 0.50 | | |
| | Zinc acetylacetonate | | | | | | | | | | 0.50 | |
| | Manganese 2-ethylhexanoate (included in manganese hexoate) | | | | | | | | | | | 0.50 |
| | KS-1260 (dibutyltin dilaurate) | | | | | | | | | | | |
| | Titanium acetylacetonate | | | | | | | | | | | |
| | Bismuth tris(2-ethylhexanoate) (included in BiCAT 8210) | | | | | | | | | | | |

TABLE 2-continued

| Composition | | Example 1 | 2 | 3 | 4 | 5 | 6 | 7 | 8 | 9 | 10 | 11 |
|---|---|---|---|---|---|---|---|---|---|---|---|---|
| | | | | | | | Composition | | | | | |
| (Unit: g) | | 1 | 2 | 3 | 4 | 5 | 6 | 7 | 8 | 9 | 10 | 11 |
| Component (D) Solvent | Toluene/ethyl acetate 9:1 mixed solvent | 85.00 | 85.00 | 85.00 | 85.00 | 85.00 | 85.00 | 85.00 | 85.00 | 85.00 | 85.00 | 85.00 |
| NCO/COOH ratio | | 1.5 | 1.5 | 1.5 | 1.5 | 1.5 | 1.5 | 1.5 | 1.5 | 1.5 | 1.5 | 1.5 |
| Pot life | | Excellent | Excellent | Excellent | Excellent | Good | Excellent | Excellent | Excellent | Excellent | Excellent | Excellent |
| T-peel strength at normal state (N/15 mm) | | 22.5 | 23.1 | 22 | 19.6 | 23.0 | 22.4 | 22.4 | 21.8 | 22.7 | 21.5 | 21.9 |
| T-peel strength after immersing in electrolytic solution solvent (N/15 mm) | | 11.0 | 10.8 | 9.6 | 9.5 | 8.2 | 8.0 | 9.2 | 9.4 | 9.0 | 7.4 | 8.5 |

TABLE 3

| | | Comparative Example | | |
|---|---|---|---|---|
| | | 1 | 2 | 3 |
| | | | Composition | |
| Composition (Unit: g) | | 12 | 13 | 14 |
| Component (A) Carboxyl group-containing polyolefin resin | (a1) | 15.00 | 15.00 | 15.00 |
| | (a2) | | | |
| | (a3) | | | |
| | (a4) | | | |
| | (a5) | | | |
| | (a6) | | | |
| Component (B) Polyfunctional isocyanate | Duranate TKA-100 (isocyanurate of hexamethylene diisocyanate) | 1.70 | 1.70 | 1.70 |
| Component (C) | BiCAT Z (zinc neodecanoate) | | | |
| | Zinc 2-ethylhexanoate (included in zinc hexoate) | | | |
| | Afco Chem ZNS-P (zinc stearate) | | | |
| | Zinc acetylacetonate | | | |
| | Manganese 2-ethylhexanoate (included in manganese hexoate) | | | |
| Metal catalyst | KS-1260 (dibutyltin dilaurate) | 0.50 | | |
| | Titanium acetylacetonate | | 0.50 | |
| | Bismuth tris(2-ethylhexanoate) (included in BiCAT 8210) | | | 0.50 |
| Component (D) Solvent | Toluene/ethyl acetate 9:1 mixed solvent | 85.00 | 85.00 | 85.00 |
| NCO/COOH ratio | | 1.5 | 1.5 | 1.5 |
| Pot life | | Excellent | Excellent | Excellent |
| T-peel strength at normal state (N/15 mm) | | 10.8 | 9.6 | 11.1 |
| T-peel strength after immersing in electrolytic solution solvent (N/15 mm) | | 1.5 | 2.0 | 1.6 |

(Discussion)

The results in Table 2 show that the adhesives for laminating a metal foil to a resin film (Examples 1 to 11) of the present invention are excellent in both T-peel strength at normal state and T-peel strength after immersing in electrolytic solution solvent.

On the other hand, the results in Table 3 show that the adhesives for laminating a metal foil to a resin film which do not contain the component (C) (Comparative Examples 1 to 3) are insufficient in both the T-peel strength at normal state and the T-peel strength after immersing in an electrolytic solution solvent.

INDUSTRIAL APPLICABILITY

The adhesive for laminating a metal foil to a resin film of the present invention has an excellent adhesive strength after immersing in an electrolytic solution, and is particularly suitable for joining aluminum foil to a heat-fusible resin film. Further, since the laminate of the present invention is excellent in electrolytic solution resistance, it is suitably used for a packaging material for a battery casing used in the preparation of secondary batteries such as lithium ion batteries; and the laminate can be formed to thereby produce a battery case excellent in electrolytic solution resistance. Thus, the production of a safe secondary battery having a long life is achieved by using the battery case.

The invention claimed is:

1. An adhesive for laminating a metal foil to a resin film, the adhesive comprising: a carboxyl group-containing polyolefin resin (A); a polyfunctional isocyanate compound (B); and a metal compound (C) being a compound of at least one metal of Groups 7 and 12, wherein the compound (C) comprises zinc neodecanoate, zinc 2-ethylhexanoate, zinc stearate, zinc acetylacetonate, or manganese 2-ethylhexanoate.

2. The adhesive for laminating a metal foil to a resin film according to claim 1, wherein the carboxyl group-containing polyolefin resin (A) comprises a modified polyolefin resin comprising, as a monomer unit, propylene or propylene and ethylene and an ethylenically unsaturated carboxylic acid or an anhydride thereof.

3. The adhesive for laminating a metal foil to a resin film according to claim 1, wherein the carboxyl group-containing polyolefin resin (A) comprises a carboxyl group-containing polyolefin resin having an MFR of 5 g/10 min to 42 g/10 min as measured at 130° C.

4. The adhesive for laminating a metal foil to a resin film according to claim 1, wherein the polyfunctional isocyanate compound (B) comprises a multimer of a polyisocyanate.

5. The adhesive for laminating a metal foil to a resin film according to claim 1, wherein the multimer of a polyisocyanate comprises an isocyanurate of a polyisocyanate.

6. The adhesive for laminating a metal foil to a resin film according to claim 1, wherein the ratio of the number of isocyanato groups contained in the polyfunctional isocyanate compound (B) to the number of carboxyl groups contained in the carboxyl group-containing polyolefin resin (A) is 0.5 to 13.

7. The adhesive for laminating a metal foil to a resin film according to claim 1, wherein the metal compound (C) comprises at least one or more carboxylate of at least one metal of Groups 7 and 12.

8. The adhesive for laminating a metal foil to a resin film according to claim 1, wherein the metal compound (C) comprises a carboxylate of zinc or manganese.

9. The adhesive for laminating a metal foil to a resin film according to claim 1, further comprising a solvent (D).

10. A laminate in which a metal foil and a resin film are laminated through an adhesive layer obtained from the adhesive for laminating a metal foil to a resin film according to claim 1.

11. The laminate according to claim 10, wherein the metal foil is aluminum foil, and the resin film comprises a heat-fusible resin film.

12. The laminate according to claim 10, wherein the thickness of the metal foil is 10 to 100 μm, and the thickness of the resin film is 9 to 100 μm.

13. A packaging material for a battery casing obtained by using the laminate according to claim 10.

14. A battery case obtained by using the packaging material for a battery casing according to claim 13.

15. A method for producing a battery case, comprising: deep drawing or bulging the packaging material for a battery casing according to claim 13.

16. The adhesive for laminating a metal foil to a resin film according to claim 1, wherein the metal compound (C) is a reaction accelerator which accelerates a reaction of the carboxyl group-containing polyolefin resin (A) and the polyfunctional isocyanate compound (B).

* * * * *